United States Patent
Tatry et al.

(10) Patent No.: US 9,837,810 B2
(45) Date of Patent: Dec. 5, 2017

(54) METHOD AND SYSTEM OF DETECTION AND PASSIVATION OF AN ELECTRIC ARC

(71) Applicants: Airbus Operations (SAS), Toulouse (FR); Airbus SAS, Blagnac (FR)

(72) Inventors: Philippe Tatry, Balma (FR); Christian Donadille, Castanet Tolosan (FR)

(73) Assignees: Airbus Operations SAS, Toulouse (FR); Airbus SAS, Blagnac (FR)

( * ) Notice: Subject to any disclaimer, the term of this patent is extended or adjusted under 35 U.S.C. 154(b) by 220 days.

(21) Appl. No.: 14/931,064

(22) Filed: Nov. 3, 2015

(65) Prior Publication Data

US 2016/0134097 A1    May 12, 2016

(30) Foreign Application Priority Data

Nov. 6, 2014  (FR) ...................................... 14 60722

(51) Int. Cl.
| | |
|---|---|
| *H02H 3/00* | (2006.01) |
| *H02H 1/00* | (2006.01) |
| *B64D 45/00* | (2006.01) |
| *H02H 7/22* | (2006.01) |

(52) U.S. Cl.
CPC ........... *H02H 1/0023* (2013.01); *B64D 45/00* (2013.01); *H02H 7/222* (2013.01)

(58) Field of Classification Search
CPC .................................................. H02H 1/0023
USPC .......................................................... 361/2
See application file for complete search history.

(56) References Cited

U.S. PATENT DOCUMENTS

| | | | | |
|---|---|---|---|---|
| 4,435,631 A | * | 3/1984 | Drouet ................. | B23K 9/0735 |
| | | | | 219/124.02 |
| 7,148,696 B2 | * | 12/2006 | Zhou ................... | G01R 31/1209 |
| | | | | 324/527 |
| 7,368,918 B2 | * | 5/2008 | Henson ................ | H02H 1/0015 |
| | | | | 324/536 |
| 8,963,555 B2 | * | 2/2015 | Wu ..................... | G01N 29/2418 |
| | | | | 324/500 |
| 2006/0164097 A1 | | 7/2006 | Zhou et al. | |

(Continued)

FOREIGN PATENT DOCUMENTS

| | | |
|---|---|---|
| EP | 2120306 | 11/2009 |
| EP | 2202859 | 6/2010 |

(Continued)

OTHER PUBLICATIONS

French Search Report, dated Jun. 23, 2015.

*Primary Examiner* — Stephen W Jackson
(74) *Attorney, Agent, or Firm* — Greer, Burns & Crain Ltd.

(57) ABSTRACT

A method and a system for the detection and passivation of an electric arc on at least one connecting element of an electrical device. The system comprises an acoustic acquisition channel configured for the acquisition of acoustic signals emitted by the connecting element, an electric acquisition channel configured for the acquisition of electric signals which are representative of the electric current intensities supplying the connecting element, and a correlator coupled to the acoustic and electric acquisition channels, configured for the evaluation of a correlation between the acoustic and electric signals and for the tripping of an appropriate cut-off signal for the interruption of an electric circuit relative to the connecting element, where the correlation is representative of the initiation of an electric arc.

10 Claims, 3 Drawing Sheets

(56) References Cited

U.S. PATENT DOCUMENTS

| | | |
|---|---|---|
| 2009/0284265 A1 | 11/2009 | Ohta et al. |
| 2010/0165521 A1 | 7/2010 | Changali et al. |
| 2014/0063662 A1 | 3/2014 | Scott |
| 2014/0247066 A1 | 9/2014 | Chaintreuil et al. |

FOREIGN PATENT DOCUMENTS

| | | |
|---|---|---|
| FR | 2827675 | 1/2003 |
| FR | 2925987 | 7/2009 |
| FR | 2977677 | 1/2013 |
| WO | 2014128263 | 8/2014 |

\* cited by examiner

METHOD AND SYSTEM OF DETECTION AND PASSIVATION OF AN ELECTRIC ARC

CROSS-REFERENCES TO RELATED APPLICATIONS

This application claims the benefit of the French patent application No. 1460722 filed on Nov. 6, 2014, the entire disclosures of which are incorporated herein by way of reference.

BACKGROUND OF THE INVENTION

The present invention relates to the field of the detection of an electric arc and, more specifically, to the detection and passivation of an electric arc in an on-board electrical device.

An electric arc may be generated where two contacts which initially conduct an electric current are separated. An electrical discharge, potentially reaching a temperature of 7000° C.-10,000° C., is then generated in the space between the two contacts, and maintains electrical conduction. The occurrence of sustained electric arcs over time in electrical storage, distribution and/or service elements may result in the deterioration of the electrical elements and adjoining equipment.

Accordingly, in order to guard against the risks of the propagation of electric arcs, it is important to detect the initiation of any electric arc in order to interrupt the electric circuit.

The detection of an electric arc is generally based upon the measurement of electric current intensity in the line supplying the electrical element. In practice, upon the occurrence of an electric arc, the current intensity rises significantly, and may exceed several times the rated current intensity.

However, in order to prevent any spurious tripping associated with false alarms, it is important to confirm the fault before any circuit interruption proceeds, thereby requiring a processing or confirmation time which, in many cases, is not compatible with the speed of propagation of the electric arc, which is of the order of 100 meters per second. The confirmation time may be several hundred milliseconds, or even several seconds, depending upon the current intensity and the temperature. These times are well in excess of those required for the extinction of the electric arc with no resulting damage to equipment and/or severe constraint thereupon.

In order to resolve problems of this type, insulating means are used for the protection of electrical elements and equipment against the risks of electric arc propagation during the confirmation time.

Specifically in the field of aeronautics, which is governed by particularly stringent constraints for safety and reliability, core electric systems and electrical distribution boxes in an aircraft are protected by a number of insulating and protective elements in order to prevent the propagation of any electric arcs between the various components or electrical elements.

In practice, the terminals of electrical elements are provided with double insulation, comprised of ceramic barriers and washers and specific surface treatments. For example, the double insulation of a retaining nut involves the surface treatment of the nut by the application thereto of an insulating material, and the addition of insulating washers with raised edges in order to inhibit the passage of an electric arc. In addition, mechanical protective structures such as grilles and/or covers are added in order to protect against small exterior metallic components or foreign bodies which might cause short-circuits.

Although highly effective, these types of protection have a number of disadvantages. Specifically, they complicate the installation, and increase both the dimensions and the mass of electrical distribution boxes. Moreover, grilles and other mechanical protective structures generate thermal stresses by restricting the exchange of heat between electrical devices and the exterior environment.

SUMMARY OF THE INVENTION

Consequently, an object of the present invention is the proposal of a system and method for the detection and passivation of an electric arc which is simple to deploy, is capable of the rapid, accurate and reliable detection of any occurrence of an electric arc in an electrical device, and is able to deliver a rapid response for the passivation of the electric arc, while eliminating the above-mentioned disadvantages.

The present invention is defined by a system for the detection and passivation of an electric arc on at least one connecting element of an electrical device, comprising:

an acoustic acquisition channel configured for the acquisition of acoustic signals emitted by the connecting element, an electric acquisition channel configured for the acquisition of electric signals which are representative of the electric current intensities supplying the connecting element, and a correlator coupled to the acoustic and electric acquisition channels, configured for the evaluation of a correlation between the acoustic and electric signals and for the tripping of an appropriate cut-off signal for the interruption of an electric circuit relative to the connecting element, where the correlation is representative of the initiation of an electric arc.

A system according to the present invention permits the near-real-time detection, in a reliable manner and with a minimal calculation time, of any incipient electric arc in the connecting element of an electrical device, and the rapid isolation of the defective connection. More specifically, this system permits the minimization of constraints on installation and insulation, whilst permitting a very high level of availability of the electrical device.

BRIEF DESCRIPTION OF THE DRAWINGS

Further characteristics and advantages of the invention will be clarified by the description of the preferred modes of embodiment of the invention, with reference to the attached figures, in which.

DETAILED DESCRIPTION OF THE PREFERRED EMBODIMENTS

The basic concept of the invention is based upon the evaluation of a correlation between two distinct physical variables (current intensity and acoustic wave) which permits the rapid and reliable detection of an incipient electric arc in an electrical device.

Figure 1:
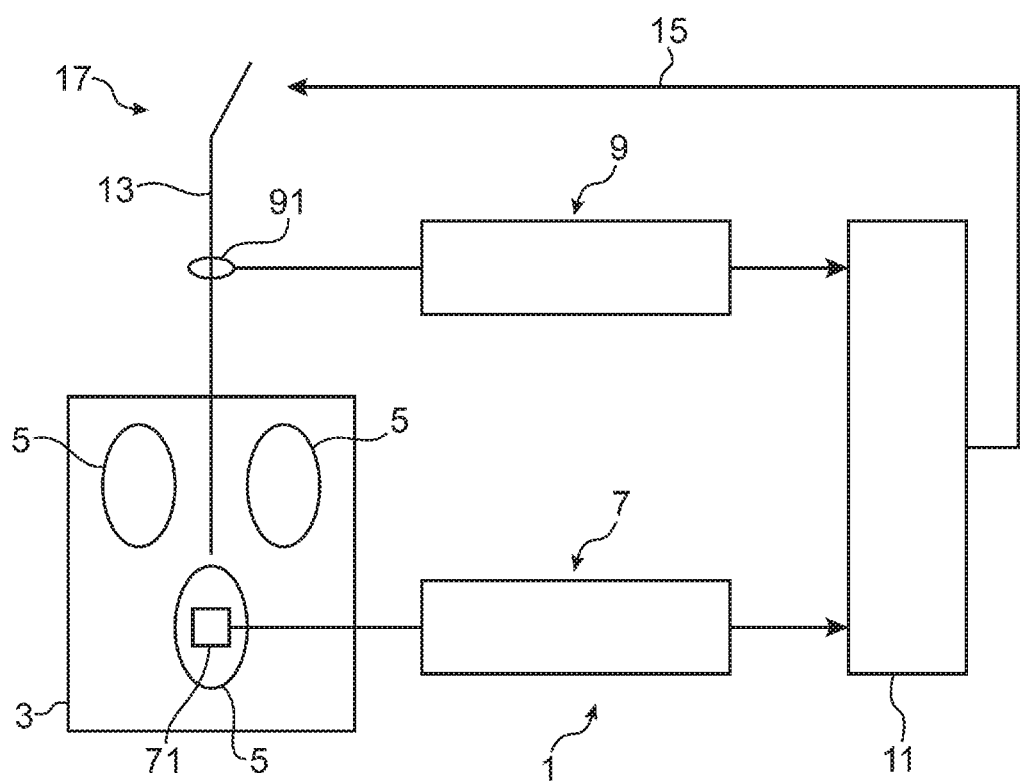
FIG. 1 shows a schematic representation of a method and a system for the detection and passivation of an electric arc in an electrical device, according to one mode of embodiment of the invention.

FIG. 1 shows a schematic representation of a method and a system 1 for the detection and passivation of an electric arc in an electrical device 3, according to one mode of embodiment of the invention.

The electrical device 3 is, for example, an electrical distribution box comprising power components and an assembly of at least one electrical connecting element 5.

The detection and passivation system 1 (designated hereinafter as the "detection system") is embodied by sensors and electronic data acquisition, processing and control cards, comprising an acoustic acquisition channel 7, an electric acquisition channel 9 and a correlator 11.

The acoustic acquisition channel 7 is configured for the acquisition of acoustic signals emitted by each connecting element 5. Specifically, the acoustic acquisition channel 7 comprises acoustic sensors 71 which are designed to capture acoustic waves emitted at the level of the connecting elements 5. Each acoustic sensor 71 is installed in a zone which is allocated to a corresponding connecting element 5, and may be comprised of one or more ultrasonic transducers (or microphones) in a bandwidth ranging from several tens of kHz to several hundred kHz.

The electric acquisition channel 9 is configured for the acquisition of electric signals which are representative of the electric current intensities supplying each connecting element 5. Specifically, at least one sensor 91 or current intensity measuring device is connected in the electric power supply line 13 which supplies the corresponding connecting element 5. It will be observed that each supply line 13 may be of the multi-phase type and, in this case, the current intensity is measured in each phase line.

The correlator 11 is coupled to the acoustic 7 and electric 9 acquisition channels and is configured for the evaluation of a correlation between the acoustic and electric signals. The correlator 11 is also configured for the tripping of an appropriate cut-off signal (arrow 15) for the interruption of the electric circuit 17 relative to the connecting element 5, where the correlation is representative of the initiation of an electric arc in the element 5. More specifically, where a correlation is established between an electric overcurrent which is representative of an incipient electric arc and an acoustic wave which is also representative of an incipient electric arc in a connecting element 5, the correlator 11 triggers the interruption of the supply line 13 supplying the connecting element 5 immediately, with no confirmation period. In practice, where a correlation is confirmed between two physical variables which are entirely distinct and are representative of the initiation of an electric arc, it is likely, with a high degree of probability, that the initiation of an electric arc is genuine rather than a false alarm. Accordingly, the defective connecting element 5 is isolated from the remaining elements of the electrical device 3 in near-real-time and, in consequence, the electric arc is passivated before any propagation of the electric arc to the vicinity of the defective connecting element 5.

Figure 2:
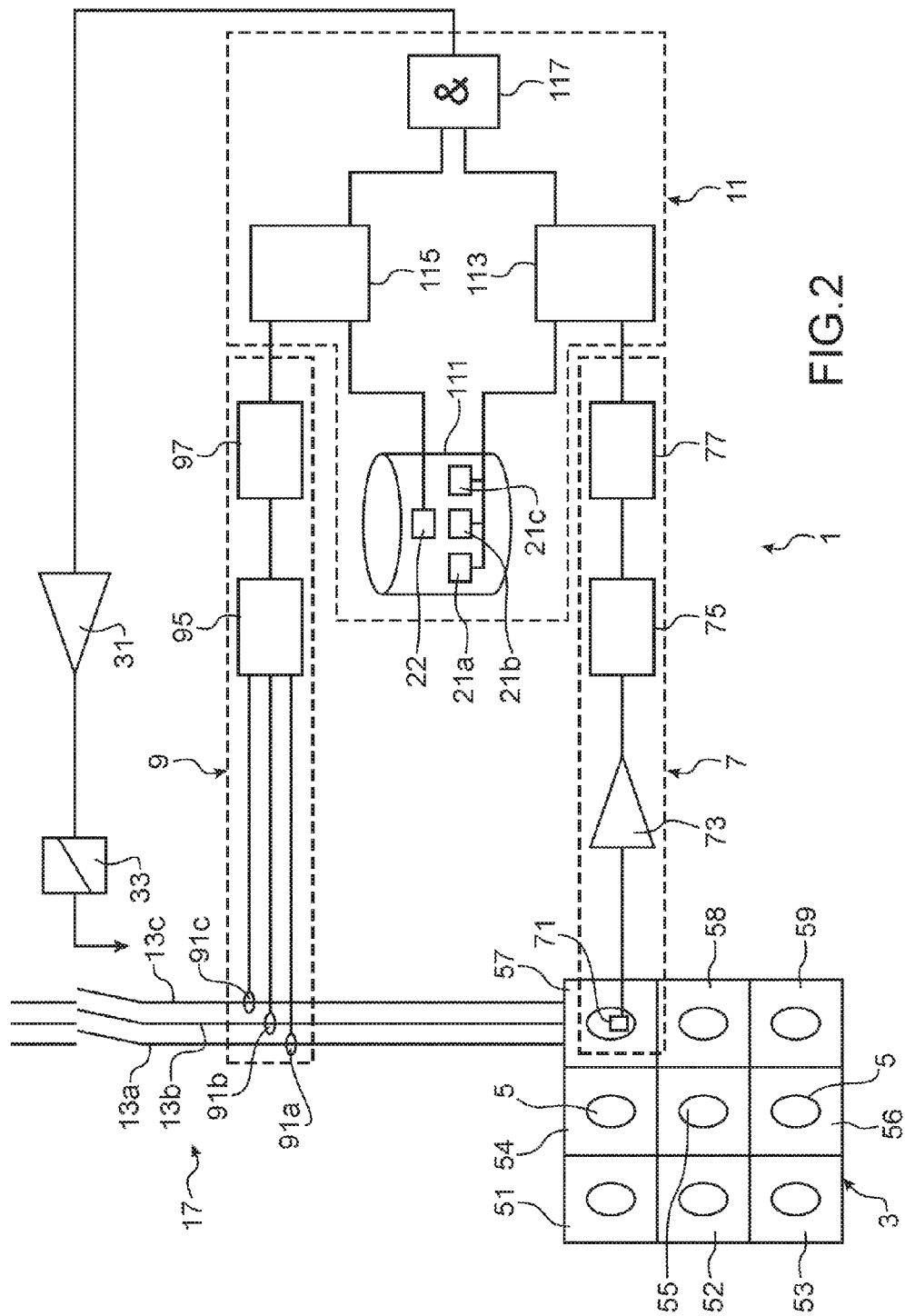
FIG. 2 shows a schematic representation of a detection system, according to a preferred mode of embodiment of the invention.

FIG. 2 shows a schematic representation of a detection system according to a preferred mode of embodiment of the invention.

According to this example, the electrical device 3 is an on-board electrical distribution cabinet or box comprising a series of connecting elements 5 arranged in corresponding compartments 51-59. The electrical distribution box 3 is included, for example, in the core electric power system of an aircraft. Each compartment 51-59 comprises a cell corresponding to a specific functional zone. Physically, the cells are preferably configured as enclosed volumes, such that only the supply rails of the connecting elements or a limited number of connectors penetrate the walls thereof. Each connecting element 5 is supplied by a supply line 13 comprising a combination of phase lines 13a, 13b, 13c. A single supply line 13 supplying a single connecting element 5 is represented. More specifically, and in the interests of simplification, only the means (i.e., the supply line 13, the acoustic 7 and electric 9 acquisition channels and the correlator 11) corresponding to a single connecting element 5 in compartment 57 are represented on the diagram shown in FIG. 2.

The acoustic acquisition channel 7 comprises an acoustic sensor 71, an amplifier 73, a first conditioner 75 and a first filter 77.

The acoustic sensor 71 is installed in the cell (or the zone) allocated to the connecting element 5. The cellular containment renders the acoustic sensor 71 insensitive to noise originating from the exterior of the cell, thereby permitting the former to capture the acoustic signals emitted by the connecting element 5 with a high degree of precision, unimpaired by interference from exterior noise. Advantageously, the sensor 71 is comprised of one or more ultrasonic transducers, for example based upon a MEMS (Micro Electro-Mechanical System).

The acoustic signal amplifier 73 is connected to the acoustic sensor 71 and is configured for the amplification of acoustic signals received from the acoustic sensor 71.

The first conditioner 75 is connected to the amplifier 73 and is configured for the formatting of acoustic signals. In practice, the acoustic signals are formatted for processing by the first filter 77. The latter is connected to the conditioner 75 and is configured for the filtering of acoustic signals at the output of the conditioner 75. The first filter 77 permits, for example, the elimination of any isolated or aberrant data present in the acoustic signals which may be attributable, for example, to random errors.

The electric acquisition channel 9 comprises electric current intensity sensors 91a-91c, a second conditioner 95 and a second filter 97.

The electric current intensity sensors 91a-91c are installed in the supply line 13 of the connecting element 5. Specifically, an electric current intensity sensor is connected in each phase line 13a, 13b, 13c for the capture of electric signals which are representative of the intensity of the electric current supplying the connecting element 5.

The second conditioner 95 is connected to the electric current intensity sensors 91a-91c and is configured for the formatting of electric signals.

In addition, the second filter 97 is connected to the second conditioner 95 and is configured for the filtering of electric signals at the output of the conditioner 95.

The correlator 11 also comprises a memory 111, an acoustic comparator 113, an electric comparator 115 and a cut-off tripping device 117.

The memory 111 is designed to store at least one acoustic reference signature 21a, which is characteristic of an electric arc, and at least one electric reference signature 22, which is also characteristic of an electric arc.

Advantageously, the memory 111 comprises a series of acoustic reference signatures 21a-21c, each of which is defined as a function of the environmental context of the connecting element 5. Specifically, each acoustic reference signature 21a-21c is defined as a function of the pressure in the zone of the connecting element 5, wherein it is known that, in the case of an aircraft, pressure is dependent upon altitude. A catalogue or a predetermined series of acoustic reference signatures 21a-21c representing electric arcs associated with different altitudes of the aircraft may be pre-recorded in the memory 111.

The series of acoustic reference signatures 21a-21c is constructed beforehand using a model for the detection of electric arcs according to pressure or altitude, using Paschen curves and/or bench tests. Accordingly, the effects of pressure and, in consequence, of altitude upon the acoustics of the electric arc and the occurrence thereof are taken into account. Advantageously, the acoustic signatures are firstly obtained by calculations, then refined by tests.

The acoustic comparator 113 is connected to the acoustic acquisition channel 7 and is configured for the comparison of acoustic signals with the acoustic reference signature(s) 21a-21c, in order to confirm whether the acoustic signals are indicative of the occurrence of an electric arc.

More specifically, the acoustic comparator 113 is designed to confirm whether the acoustic signals are indicative of the occurrence of an electric arc by the calculation of standardized correlation coefficients between the acoustic signals and an acoustic reference signature, and by the comparison of the correlation coefficients with a predetermined acoustic threshold which corresponds to a sensitivity threshold in relation to the risk of a false alarm. Accordingly, if a correlation coefficient exceeds the predetermined acoustic threshold, the acoustic signals are considered to be indicative of the occurrence of an electric arc.

Advantageously, the acoustic comparator 113 applies an analysis involving the vector processing of acoustic signals, or a filtering process which is appropriate to the learning of electric arc signals. In practice, a robust and sufficiently generic model of the ARMA type (Auto Regressive Moving Average) may be used in the interests of adaptation to the variability of the types of acoustic signatures generated by electric arcs. The ARMA model is an auto-regressive model with a moving average, which may be applied to the acoustic signals measured by the application of a sliding time window. The ARMA model permits the evaluation of the average quadratic error in the reference signature in relation to actual signals measured in conjunction with an electric arc.

Moreover, the electric comparator 115 is connected to the electric acquisition channel 9 and is configured for the comparison of electric signals with the electric reference signature(s) 22, in order to confirm whether the electric signals are indicative of the occurrence of an electric arc. Specifically, where an overcurrent exceeds an electric detection threshold of approximately two times the rated current between the phase lines 13a-13c, the electric signals are considered as indicative of the occurrence of an electric arc between these phases. Likewise, where the current intensity lies between several tens of milliamps (mA) and several amperes (A), the electric signals are considered as indicative of the occurrence of an electric arc between the live part and the structure and/or the ground of the connecting element 5.

The cut-off tripping device 117 is coupled to the acoustic 113 and electric 115 comparators, and is configured for the tripping of cut-off signal 15 if the acoustic signals are indicative of an electric arc and the electric signals are also indicative of an electric arc.

The detection system 1 also comprises a control amplifier 31 and an electrical switching device 33 connected to the control amplifier 31.

The control amplifier 31 is configured for the amplification of the cut-off signal 15 in order to actuate the interruption of the electric circuit 17 relative to the compartment 57 affected by an electric arc.

The electrical switching device 33 (comprising, for example, relays, electronic switches or electro-mechanical switches) is configured for the interruption of the electric circuit 17 of the connecting element 5 upon the reception of the cut-off signal 15 from the control amplifier 31.

Figure 3:
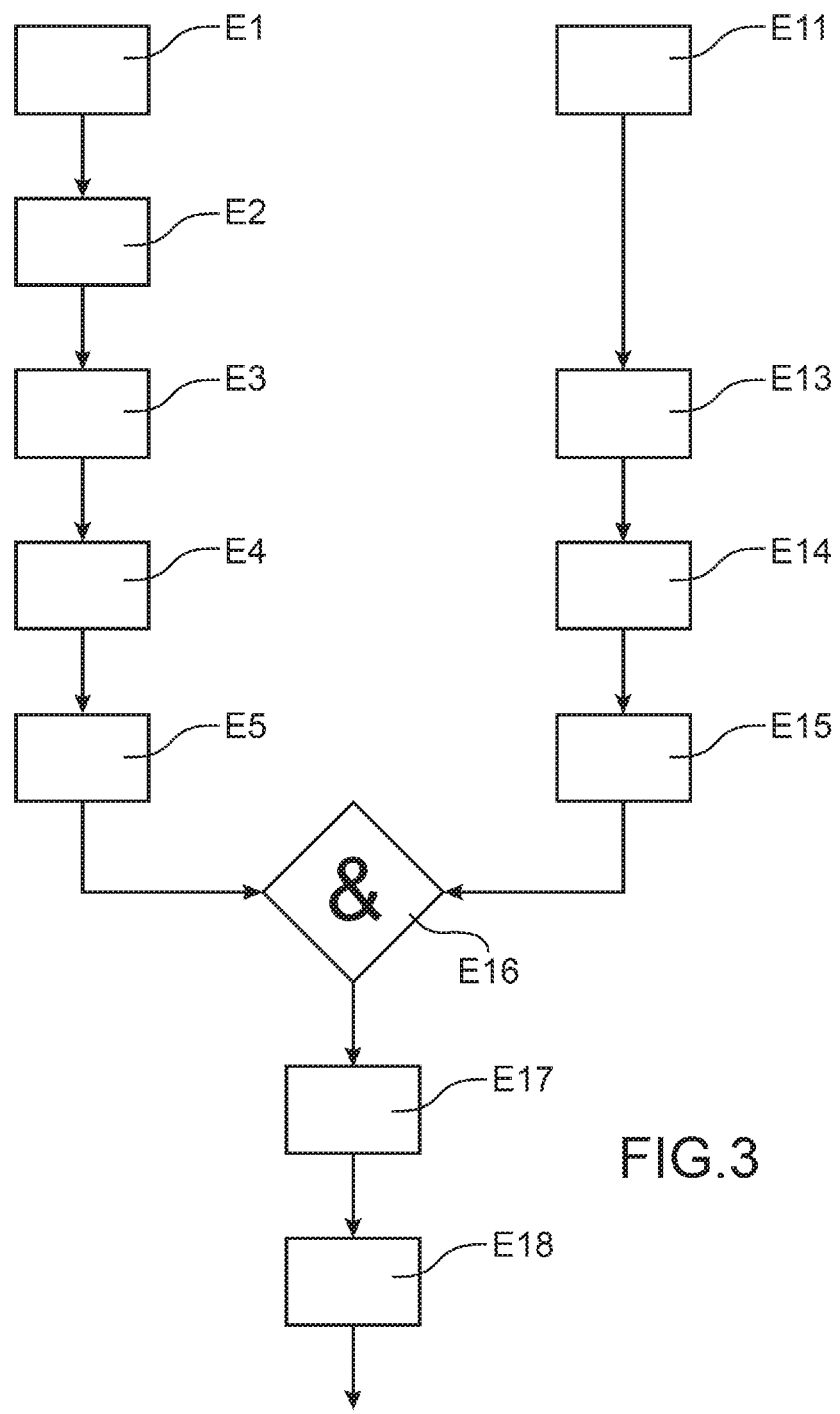
FIG. 3 shows a schematic representation of a method for the detection of an electric arc on an electrical device, according to the detection system represented in FIG. 2.

FIG. 3 shows a schematic representation of a method for the detection of an electric arc on an electrical device, according to the detection system represented in FIG. 2.

Steps E1-E5 and E11-E15 are executed simultaneously.

In step E1, an acoustic sensor 71 in a compartment 57 of a connecting element 5 detects a noise or acoustic signals which may be associated with the occurrence of an electric arc.

In step E2, the acoustic amplifier 73 amplifies the acoustic signals, which are then conditioned in step E3 by the first conditioner 75 and filtered in step E4 by the first filter 77.

In step E5, the acoustic comparator 113 applies a sliding time window for the moveable averaging (in accordance with the ARMA model) of acoustic signals received successively from the first filter 77, thereby generating a succession of average acoustic signals.

The acoustic comparator 113 then compares each average acoustic signal with at least one predetermined acoustic signature 21a selected from the series of acoustic reference signatures 21a-21c, each of which corresponds to a representative signature of an electric arc, as a function of pressure or the altitude of the aircraft.

In other words, the altitude of the aircraft is applied as a selection parameter for the selection of the acoustic signature which corresponds to the current position of the aircraft. The acoustic comparator 113 then compares each average acoustic signal with the selected acoustic signature 21a.

Advantageously, the acoustic comparator 113 executes the comparison by calculating a standardized convolution product between the average acoustic signal relative to the connecting element 5 and the selected acoustic signature 21a. The standardized convolution product score then indicates the existence or otherwise of a correlation between the average acoustic signal (which is representative of the noise emitted by the connecting element) and the selected acoustic signature 21a which is representative of an electric arc. Specifically, the acoustic comparator 113 compares each of the standardized scores with the predetermined acoustic threshold, in order to confirm the detection of an electric arc where at least one score exceeds the acoustic threshold. It will be observed that the acoustic threshold may be set by experimentation and/or on the basis of operating feedback, in order to prevent any false alarm.

At the same time, in step E11, the electric sensors 91a-91c measure the intensity of the current supplying the connecting elements 5. Electric signals received from the sensors 91a-91c are conditioned in step E13 by the second conditioner 95, and are then filtered in step E14 by the second filter 97.

In step E15, the electric comparator 115 compares the electric signals with the electric reference signature(s) 22 in order to confirm whether the electric signals are indicative of the occurrence of an electric arc. Specifically, where the electric signals relative to a connecting element 5 show an overcurrent (i.e., exceed an electric detection threshold), the signals are then considered as indicative of the occurrence of an electric arc.

In step E16 if a same connecting element 5 shows acoustic signals which are indicative of an electric arc and electric signals which are also indicative of an electric arc, the cut-off tripping device 117 generates a cut-off signal 15.

In step E17, the control amplifier 31 amplifies the cut-off signal and, in step E18, the electrical switching device 33 interrupts the electric circuit 17 upline of the connecting element 5 affected by the electric arc.

Accordingly, the detection method and system according to the present invention permit the rapid and reliable detection and extinction of an electric arc, for example in core electric systems and the power distribution boxes of an aircraft. In practice, the correlation of two distinct physical variables (i.e., electric current and an acoustic wave, considered with reference to the signatures of electric arcs) permits the reliable and real-time identification of the initiation of an electric arc, without the necessity for a confirmation time.

Due to the rapid isolation of the zone affected by an electric arc, constraints on installation and insulation in the design of distribution boxes can be minimized, thereby permitting significant savings in both cost and weight.

Moreover, zonal protection offers an advantage, in that only the defective element is isolated, thereby improving both the availability and the flexibility of the distribution system and, accordingly, of the equipment supplied.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for the detection and passivation of an electric arc on at least one connecting element of an electrical device, comprising:
    an acoustic acquisition channel configured for the acquisition of acoustic signals emitted by said connecting element,
    an electric acquisition channel configured for the acquisition of electric signals which are representative of the electric current intensities supplying said connecting element, and
    a correlator coupled to said acoustic and electric acquisition channels, configured for the evaluation of a correlation between the acoustic and electric signals and for the tripping of an appropriate cut-off signal for the interruption of an electric circuit relative to said connecting element, where said correlation is representative of the initiation of an electric arc, said correlator comprising:
        a memory for the storage of at least one acoustic signature for an electric arc and at least one electric signature for an electric arc,
        an acoustic comparator connected to said acoustic acquisition channel, configured for the comparison of acoustic signals with said at least one acoustic signature, in order to confirm whether the acoustic signals are indicative of the occurrence of an electric arc,
        an electric comparator connected to said electric acquisition channel and configured for the comparison of electric signals with said at least one electric signature, in order to confirm whether said electric signals are indicative of the occurrence of an electric arc, and
        a cut-off tripping device coupled to said acoustic and electric comparators, and configured for the tripping of the cut-off signal if the acoustic signals are indicative of an electric arc and the electric signals are also indicative of an electric arc.

2. The system according to claim 1, wherein said memory is designed for the storage of a series of acoustic signatures, each of said acoustic signatures being defined as a function of an environmental context of said connecting element.

3. The system according to claim 2, wherein each acoustic signature is defined as a function of the altitude of said connecting element.

4. The system according to claim 1, wherein the acoustic comparator is configured for the averaging of acoustic signals in accordance with a moving average model, prior to comparison with said at least one acoustic reference signature.

5. The system according to claim 1, wherein the acoustic acquisition channel comprises:
    an acoustic sensor installed in a zone allocated to the connecting element and configured for the capture of acoustic signals emitted by said connecting element,
    an acoustic signal amplifier configured for the amplification of acoustic signals received from said at least one acoustic sensor,
    a first conditioner configured for the formatting of acoustic signals, and
    a first filter configured for the filtering of acoustic signals at the output of said conditioner.

6. The system according to claim 1, wherein the electric acquisition channel comprises:
    at least one electric current intensity sensor installed in a supply line of said connecting element and configured for the capture of electric signals which are representative of the electric current intensities supplying said connecting element,
    a second conditioner configured for the formatting of electric signals, and
    a second filter configured for the filtering of electric signals at the output of said conditioner.

7. The system according to claim 1, further comprising:
    a control amplifier configured for the amplification of said cut-off signal in order to actuate the interruption of said electric circuit relative to said connecting element, and
    an electrical switching device configured for the interruption of said electric circuit of the connecting element upon the reception of said cut-off signal from the control amplifier.

8. The system according to claim 1, wherein said electrical device is an on-board electrical distribution box comprising a series of connecting elements arranged in corresponding compartments, wherein each connecting element is supplied by a supply line comprising a combination of phase lines.

9. An aircraft comprising:
    an electrical distribution box and a detection system for the detection and passivation of an electric arc on at least one connecting element of the electrical device, the detection system comprising:

an acoustic acquisition channel configured for the acquisition of acoustic signals emitted by said connecting element, an electric acquisition channel configured for the acquisition of electric signals which are representative of the electric current intensities supplying said connecting element, and a correlator coupled to said acoustic and electric acquisition channels, configured for the evaluation of a correlation between the acoustic and electric signals and for the tripping of an appropriate cut-off signal for the interruption of an electric circuit relative to said connecting element, where said correlation is representative of the initiation of an electric arc, said correlator comprising:

a memory for the storage of at least one acoustic signature for an electric arc and at least one electric signature for an electric arc, an acoustic comparator connected to said acoustic acquisition channel, configured for the comparison of acoustic signals with said at least one acoustic signature, in order to confirm whether the acoustic signals are indicative of the occurrence of an electric arc, an electric comparator connected to said electric acquisition channel and configured for the comparison of electric signals with said at least one electric signature, in order to confirm whether said electric signals are indicative of the occurrence of an electric arc, and a cut-off tripping device coupled to said acoustic and electric comparators, and configured for the tripping of the cut-off signal if the acoustic signals are indicative of an electric arc and the electric signals are also indicative of an electric arc.

10. A method for the detection and passivation of an electric arc on at least one connecting element of an electrical device, comprising the following steps:

acquiring acoustic signals emitted by said connecting element, acquiring electric signals representative of the intensity of electric current supplying said connecting element, comparing said acoustic signals with at least one acoustic signature in order to confirm whether said acoustic signals are indicative of the occurrence of an electric arc, comparing said electric signals with at least one electric signature in order to confirm whether the electric signals are indicative of the occurrence of an electric arc, and tripping an appropriate cut-off signal for the interruption of an electric circuit relative to said connecting element, where the acoustic signals are indicative of an electric arc and the electric signals are also indicative of an electric arc.

* * * * *